United States Patent [19]

Robertshaw

[11] 4,132,160
[45] Jan. 2, 1979

[54] ROOF VENTILATOR

[76] Inventor: Michael F. Robertshaw, P. O. Box 21, Bridgwater, Somerset, TA6 5LY, England

[21] Appl. No.: 804,586

[22] Filed: Jun. 8, 1977

[30] Foreign Application Priority Data

Jun. 12, 1976 [GB] United Kingdom ............... 2442576

[51] Int. Cl.² ........................................... F24F 7/02
[52] U.S. Cl. ................................. 98/42 R; 98/2.14; 98/13; 49/193
[58] Field of Search ................... 98/2, 2.14, 2.15, 8, 98/13, 19, 32, 37, 42, 41 R; 52/198-200; 49/192, 193, 261, 382

[56]   References Cited
U.S. PATENT DOCUMENTS

| 2,337,632 | 12/1943 | Winser | 98/13 |
| 2,372,164 | 3/1945 | Woodhams | 98/2.14 |
| 2,476,402 | 7/1949 | Cook | 98/13 |
| 3,685,093 | 8/1972 | Sanders et al. | 49/193 |
| 3,861,083 | 1/1975 | Goiot | 49/193 |
| 3,979,148 | 9/1976 | Martin | 98/2.14 |

Primary Examiner—Henry C. Yuen
Attorney, Agent, or Firm—Biebel, French & Nauman

[57]   ABSTRACT

The present invention relates to a ventilator assembly for caravans or buildings. A ventilator panel is provided with internal projections any one of which can be engaged by a wiper arm to hold that part of the panel against opening movement. A slidable shaft raises the remainder of the panel so that the orientation of the opening can be selected.

6 Claims, 2 Drawing Figures

ROOF VENTILATOR

The invention relates to ventilator panel assemblies suitable for caravans or buildings.

The invention has for an object to provide a ventilator panel assembly which is compact, robust and simple to operate.

Accordingly the invention consists in a ventilator panel assembly comprising a panel mounted in an opening so that the rim of the panel is movable with respect to the rim of the opening, a shaft connected to the panel so that movement of the shaft raises or lowers the panel and a movable wiper arm movable to engage with an internal projection on the panel to restrict the movement of the panel in response to movement of the shaft.

Figure 1:
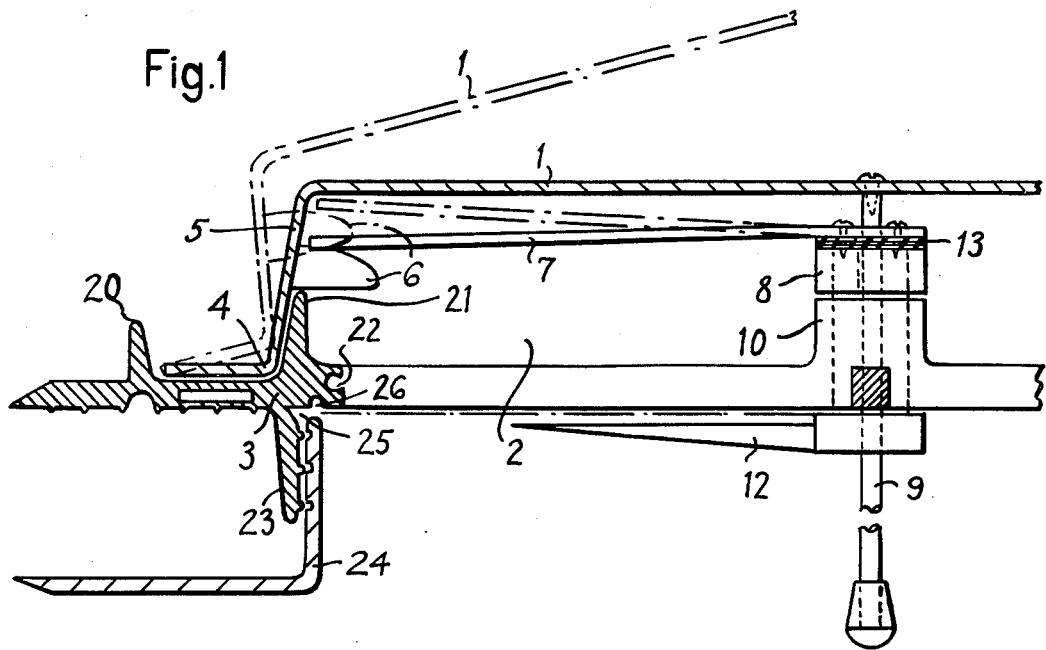
Figure 2:
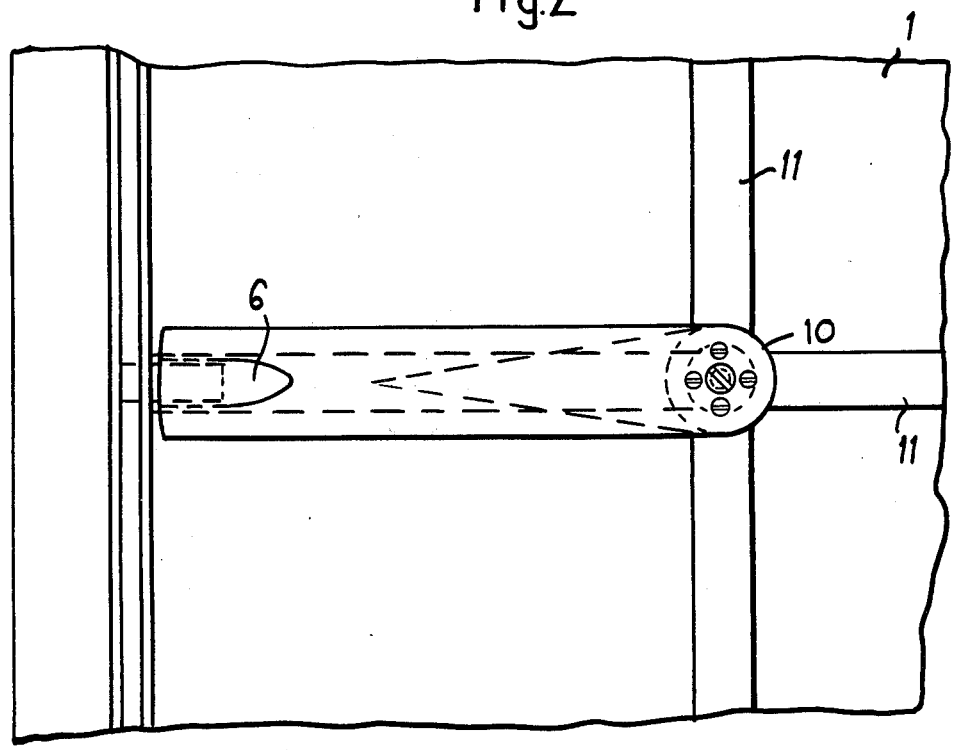

In order that the present invention may be more readily understood, an embodiment thereof will now be described by way of example and with reference to the accompanying drawings in which:

FIG. 1 is a section through a ventilator panel assembly constructed in accordance with the present invention, and FIG. 2 is a plan view of the ventilator panel assembly of FIG. 1.

Thus the ventilator panel assembly shown in the drawing comprises a substantially rectangular, dished cover 1 which may be of transparent material and which is generally rectangular in plan. The cover is mounted over a roof opening 2 having a trim 3 so that the cover can be pivotted about any one of its four transverse edges of which one, indicated at 4, is shown. Each wall 5 of the cover 1 has an inwardly extending projection 6 there thus being four projections in all. As shown in the drawing the free end of wiper arm 7 engages over the projection 6, the other end of the arm 7 being secured to a tubular member 8 rotatable about a flexible shaft 9, the shaft being slidably mounted in a central boss 10 carried by cross arms 11 extending across the roof opening 2. The member 8 also carries a direction selection arm 12 in register with the arm 7 so as to indicate to a user the position of arm 7.

It will be appreciated that when arm 7 is in the position shown engaging over projection 6, raising the shaft 9 will cause the cover to pivot about the edge 4 so as to provide an opening at the opposite edge, the cooperation between arm 7 and projection 6 preventing the edge shown from being raised.

It will also be appreciated that by rotating the arm 7 through 90° so that the arm 7 engages a projection corresponding to projection 6 on the next side of the cover, then subsequent raising of shaft 9 will cause the orientation of the ventilator opening also to be shifted through 90°.

In order that an intermediate opening of the panel 1 may be achieved, a frictional element 13 is provided which acts on the flexible shaft 9. In order to close the panel 1 a reverse operation to the foregoing procedure is carried out in so far that a downward force is exerted on shaft 9, which may by virtue of its flexibility, be stowed at a 90° angle to the perpendicular. This action of stowing, which bends the flexible shaft 9, creates an additional restrictive force to prevent opening of the panel 1 when such a condition is not desired.

It will be appreciated that suitable interlock systems may be provided to prevent raising of the panel 1 when the wiper arm 7 is not in engagement with a projection 6, or to prevent movement of the arm 7 once the panel 1 is in a raised position.

The trim member 3 shown in FIG. 1 may be made from a suitable thermoplastics material and may be extruded or otherwise fabricated. It has flanges 20, 21 limiting sideways movement of panel 1 and a groove 22 in which is received a correspondingly shaped portion at the free ends of the cross bars 11 so that the latter can be mounted to extend across the opening 2. The trim also has a downwardly extending flange 23 which may be secured against the wall of the opening 2 and by a further trim member 24. The base of flange 23 has a rebate at 25 to enable the flange 24 to be easily folded for transport and storage so as substantially to reduce the amount of space it requires. The trim member 3 also has provision at 26 to carry a flyscreen if required.

I claim:

1. A ventilator panel assembly comprising:
   (a) a rim member defining an opening;
   (b) a panel member mounted so as to close said opening;
   (c) mounting means associated with said rim member;
   (d) a shaft vertically supported by said mounting means so as to be vertically slidable therein into a raised position so as to lift said panel relative to said rim,
   (e) a movable wiper arm mounted on said mounting means for pviotal movement about an axis centrally disposed in relation to said rim and
   (f) a plurality of projection means extending from said panel and engageable by said arm to prevent upwards movement of that part of said panel associated with said projection means, the arrangement being such that when one of said projection means is engaged by said wiper arm and said shaft is raised to raise said panel the direction in which the panel opens is determined by which of the projection means has been engaged.

2. An assembly as claimed in claim 1, wherein said panel is rectangular, and wherein said projection means comprise a projection projecting inwardly of each side wall of the panel, whereby in accordance with the position of said wiper arm said panel may be opened in one of four selected directions.

3. An assembly as claimed in claim 2, wherein said support means comprise:
   (a) a central boss,
   (b) cross arms extending across said opening and supporting said boss.

4. An assembly as claimed in claim 3, and further comprising an indicator arm rotatable with said wiper arm and adapted to indicate the direction of opening of said panel.

5. An assembly as claimed in claim 4, and comprising a tubular member on which said wiper and indicator arms are mounted, said shaft extending slidably through the bore in said tubular member.

6. An asembly as claimed in claim 5, and further comprising a friction member carried by said central boss and engaging said shaft so as to be capable of holding the latter in an intermediate position.

* * * * *